US010783604B2

(12) United States Patent
Takemoto et al.

(10) Patent No.: US 10,783,604 B2
(45) Date of Patent: Sep. 22, 2020

(54) IMAGE PROCESSING APPARATUS, IMAGE PROCESSING METHOD, AND IMAGE PROCESSING PROGRAM

(71) Applicants: FUJIFILM CORPORATION, Minato-ku, Tokyo (JP); FUJI XEROX CO., LTD., Minato-ku, Tokyo (JP)

(72) Inventors: Kosei Takemoto, Kanagawa (JP); Kazuyuki Itagaki, Kanagawa (JP); Takashi Nagao, Kanagawa (JP)

(73) Assignees: FUJIFILM CORPORATION, Tokyo (JP); FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 16/134,972

(22) Filed: Sep. 19, 2018

(65) Prior Publication Data

US 2019/0019271 A1 Jan. 17, 2019

Related U.S. Application Data

(63) Continuation of application No. PCT/JP2017/002572, filed on Jan. 25, 2017.

(30) Foreign Application Priority Data

Mar. 24, 2016 (JP) ................................ 2016-060522

(51) Int. Cl.
*G06T 1/60* (2006.01)
*G06F 12/0875* (2016.01)
*G06T 1/20* (2006.01)

(52) U.S. Cl.
CPC ............ *G06T 1/60* (2013.01); *G06F 12/0875* (2013.01); *G06T 1/20* (2013.01); *G06F 2212/1024* (2013.01); *G06F 2212/455* (2013.01)

(58) Field of Classification Search
CPC ........... G06T 1/60; G06T 1/20; G06T 15/005; G06T 17/20; G06T 15/20; G06F 12/0875;
(Continued)

(56) References Cited

U.S. PATENT DOCUMENTS

2004/0184057 A1 9/2004 Nakabayashi et al.
2005/0138045 A1* 6/2005 Zarrinkoub ............. G06F 17/10
(Continued)

FOREIGN PATENT DOCUMENTS

JP 2000-232587 A 8/2000
JP 2004-311019 A 11/2004
(Continued)

OTHER PUBLICATIONS

International Search Report issued in International Application No. PCT/JP2017/002572 dated Feb. 28, 2017.
(Continued)

*Primary Examiner* — Xilin Guo
(74) *Attorney, Agent, or Firm* — Solaris Intellectual Property Group, PLLC

(57) ABSTRACT

An image processing apparatus that executes image processing using an object group in which plural objects that perform image processing with respect to input image data stored in a storage region and output output image data are connected to each other is provided. The apparatus includes: a determination section that determines whether performing overwriting on the input image data using the output image data is possible according to each piece of processing content of the image processing; a controller that performs a setting for setting a storage region of the output image data of the image processing as a region including a storage region in which the input image data on which the overwriting is possible is stored, and performs a control for executing the image processing using the object group, with
(Continued)

respect to the image processing for which it is determined that the overwriting is possible.

9 Claims, 9 Drawing Sheets

(58) Field of Classification Search
CPC ...... G06F 2212/455; G06F 2212/1024; G06N 3/084; G06N 3/10
See application file for complete search history.

(56) References Cited

U.S. PATENT DOCUMENTS

| 2006/0188236 | A1* | 8/2006 | Kitagawa ............ G06F 12/0879 386/328 |
| 2008/0065964 | A1 | 3/2008 | Zarrinkoub et al. |
| 2010/0328325 | A1* | 12/2010 | Sevigny .................... G06T 1/20 345/522 |
| 2011/0057937 | A1* | 3/2011 | Wu ..................... G06F 15/8023 345/505 |
| 2011/0310107 | A1 | 12/2011 | Shiraki |

FOREIGN PATENT DOCUMENTS

| JP | 2006-287485 A | 10/2006 |
| JP | 2007-524156 A | 8/2007 |
| JP | 2011-521370 A | 7/2011 |
| JP | 4725683 B2 | 7/2011 |
| JP | 2012-3619 A | 1/2012 |
| JP | 2015-508528 A | 3/2015 |

OTHER PUBLICATIONS

Written Opinion of the ISA issued in International Application No. PCT/JP2017/002572 dated Feb. 28, 2017.

* cited by examiner

FIG. 5

| TYPE (LARGE CLASSIFICATION) | PROCESSING CONTENT (SMALL CLASSIFICATION) | POSSIBILITY INFORMATION |
|---|---|---|
| COLOR CONVERSION | RGB → YCbCr | POSSIBLE |
|  | RGB → CMYK | IMPOSSIBLE |
|  | ⋮ | ⋮ |
| MAGNIFICATION | LINEAR INTERPOLATION | IMPOSSIBLE |
|  | B-SPLINE INTERPOLATION | IMPOSSIBLE |
|  | ⋮ | ⋮ |
| REDUCTION | SIMPLE THINNING-OUT | POSSIBLE |
|  | BICUBIC INTERPOLATION | IMPOSSIBLE |
|  | ⋮ | ⋮ |
| WING REGION ADDITION | DUPLICATION | ESSENTIAL |
|  | CONSTANT FILLING | ESSENTIAL |
|  | ⋮ | ⋮ |
| ⋮ | ⋮ | ⋮ |

64

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2017/002572, filed on Jan. 25, 2017, which is incorporated herein by reference in its entirety. Further, this application claims priority from Japanese Patent Application No. 2016-060522, filed on Mar. 24, 2016, the disclosure of which is incorporated by reference herein in its entirety.

BACKGROUND

Technical Field

A technique of the present disclosure relates to an image processing apparatus, an image processing method, and an image processing program.

Related Art

In the related art, in performing a process with respect to input data stored in a storage region and outputting output data, a technique for performing an in-place process of performing overwriting on the input data to store the output data is known (see JP2007-524156A).

Further, a technique that applies the in-place process to image processing and overwrites output image data obtained by performing image processing with respect to input image data stored in a storage region on the input image data for storage is also known (see JP2011-521370A and JP2015-508528A). Hereinafter, a process of storing output image data in a storage region different from a storage region in which input image data is stored is referred to as an out-place process.

By performing the above-mentioned in-place process, compared with a case where the out-place process is performed, it is possible to reduce the amount of a used storage region. However, there may be a case where the in-place process cannot be performed according to content of processes. In this case, if the in-place process is performed, output data stored in a storage region becomes data different from data obtained as a process is normally performed.

In the techniques disclosed in JP2007-524156A, JP2011-521370A, and JP2015-508528A, whether or not the in-place process is possible in a process with respect to input data is not considered. Further, a method for causing a user to determine whether or not the in-place process is possible in the process with respect to the input data may be considered, but in this case, a burden on the user increases.

SUMMARY

The technique of this disclosure provides an image processing apparatus, an image processing method, and an image processing program capable of reducing a burden on a user and reducing the amount of a used storage region in image processing, compared with a case where a user determines whether or not an in-place process is possible.

According to a first aspect of the invention, there is provided an image processing apparatus that executes image processing using an object group in which a plurality of objects that perform image processing with respect to input image data stored in a storage region and output output image data are connected to each other, comprising: a determination section that determines whether performing overwriting on the input image data using the output image data is possible according to each piece of processing content of the image processing; and a controller that performs a setting for setting a storage region of the output image data of the image processing as a region including a storage region in which the input image data on which the overwriting is possible is stored, and performs a control for executing the image processing using the object group, with respect to the image processing for which it is determined by the determination section that the overwriting is possible.

According to a second aspect of the invention, in the image processing apparatus according to the first aspect of the invention, the controller may set, in a case where the size of the output image data is larger than the size of the input image data on which the overwriting is possible, a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

Further, according to a third aspect of the invention, the image processing apparatus according to the first aspect or the second aspect of the invention may further comprise: an output section that outputs output image data of a processing result of image processing executed by an object at a final stage of the object group; and a reception section that receives an input from a user, in which the controller may perform a setting for setting the storage region of the output image data as a region different from the storage region of the input image data and may perform a control for executing the image processing using the object group again, with respect to at least one image processing for which it is determined by the determination section that the overwriting is possible, in a case where an input indicating that the processing result is abnormal is received by the reception section.

According to a fourth aspect of the invention, in the image processing apparatus according to any one of the first aspect to the third aspect of the invention, the controller may perform the control for executing the image processing using a processor different from a processor in which the determination in the determination section is executed.

Particularly, according to a fifth aspect of the invention, in the image processing apparatus according to the fourth aspect of the invention, the controller may perform the control for executing the image processing using a graphics processing unit having a local memory.

Further, according to a sixth aspect of the invention, the image processing apparatus according to any one of the first aspect to the fifth aspect of the invention may further comprise a division section that divides a part that is a processing target of the input image data into a plurality of pieces of divided image data, in which the controller may perform the control for executing the image processing using the object group for each piece of divided image data.

Particularly, according to a seventh aspect of the invention, in the image processing apparatus according to the sixth aspect of the invention, the division section may divide, in a case where the image processing is executed using a graphics processing unit having a cache memory and a local memory, the input image data into image data having a size depending on a capacity of a last level cache of the graphics processing unit.

Further, according to an eighth aspect of the invention, in the image processing apparatus according to the sixth aspect or the seventh aspect of the invention, the division section may divide, in a case where the image processing is executed using a central processing unit having a cache memory, the input image data into image data having a size depending on a capacity of a predetermined cache memory other than a last level cache of the central processing unit.

According to a ninth aspect of the invention, there is provided an image processing method using an image processing apparatus that executes image processing using an object group in which a plurality of objects that perform image processing with respect to input image data stored in a storage region and output output image data are connected to each other, the method comprising: determining whether performing overwriting on the input image data using the output image data is possible according to each piece of processing content of the image processing; and performing a setting for setting a storage region of the output image data of the image processing as a region including a storage region in which the input image data on which the overwriting is possible is stored, and performing a control for executing the image processing using the object group, with respect to the image processing for which it is determined that the overwriting is possible.

According to a tenth aspect of the invention, there is provided an image processing program for causing a computer to function as the determination section and the controller of the image processing apparatus according to any one of the first aspect to the eighth aspect.

According to embodiments of the invention, compared with a case where a user determines whether an in-place process is possible, it is possible to reduce a burden on the user, and to reduce the amount of a used storage region in image processing.

BRIEF DESCRIPTION OF THE DRAWINGS

FIG. 5 is a schematic view showing an example of feature information according to respective embodiments.

DETAILED DESCRIPTION

Hereinafter, embodiments for executing the technique of the present disclosure will be described in detail with reference to the accompanying drawings.

First Embodiment

First, a configuration of a computer 10 that functions as an image processing apparatus will be described with reference to FIG. 1. The computer 10 may be a computer embedded in an image handling device that performs image processing inside a copying machine, a printer, a facsimile machine, a multifunction machine that performs functions of these machines, a scanner, or the like. Further, the computer 10 may be an independent computer such as a personal computer (PC), or may be a computer embedded in a portable device such as a personal digital assistant (PDA) or a mobile phone.

Figure 1:
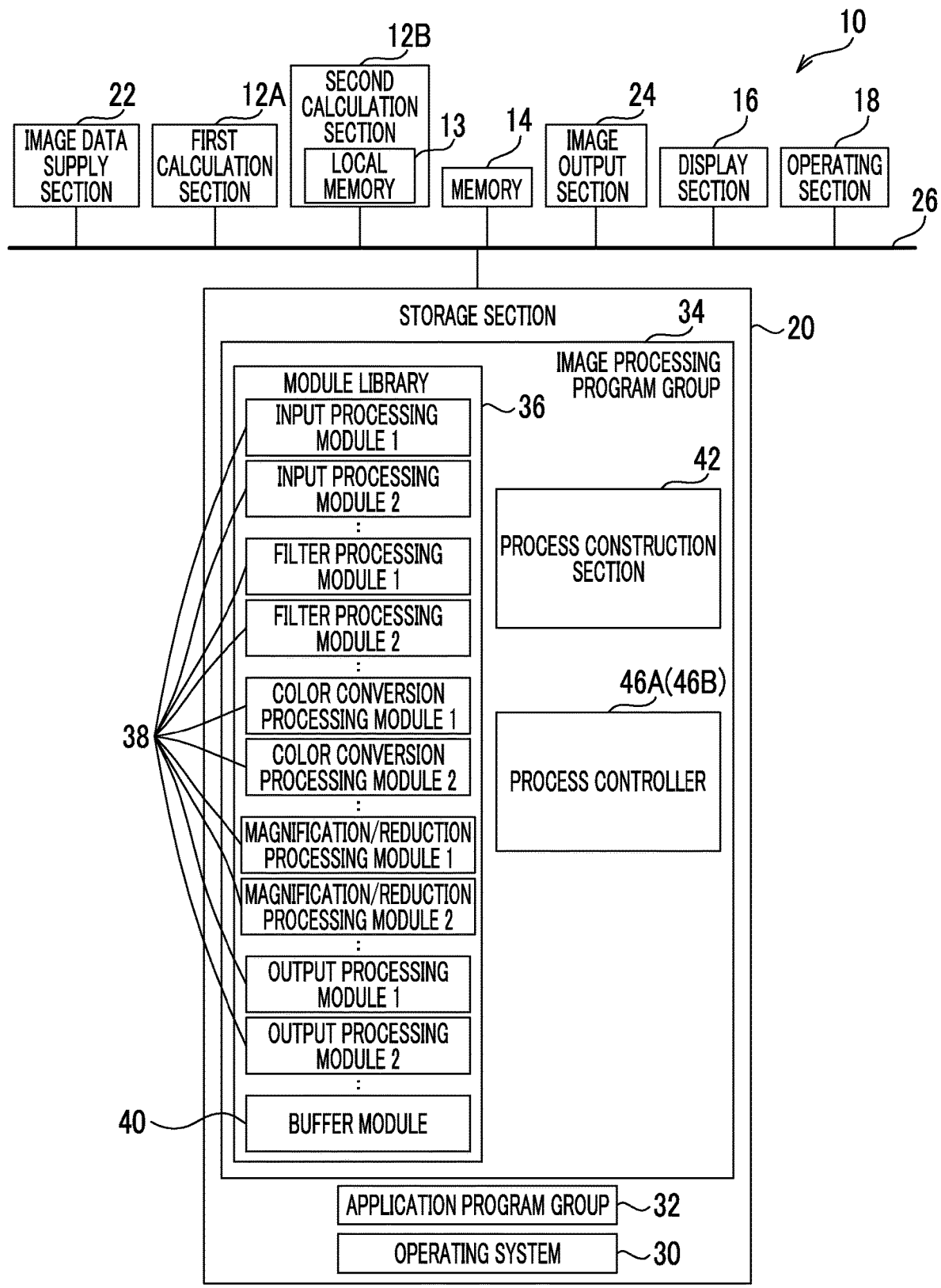
FIG. 1 is a block diagram showing an example of a configuration of a computer that functions as an image processing apparatus according to respective embodiments.

As shown in FIG. 1, the computer 10 according to this embodiment includes a first calculation section 12A, a second calculation section 12B, a memory 14, a display section 16, an operating section 18, a storage section 20, an image data supply section 22, and an image output section 24. Further, the respective sections of the first calculation section 12A, the second calculation section 12B, the memory 14, the display section 16, the operating section 18, the storage section 20, the image data supply section 22, and the image output section 24 are connected to each other through a bus 26.

The first calculation section 12A according to this embodiment is a main processor of the computer 10, and for example, is a central processing unit (CPU). Further, the second calculation section 12B according to this embodiment is a graphics processing unit (GPU) having a local memory 13 therein, for example. The second calculation section 12B may be the same type of CPU as in the first calculation section 12A, or may be a different type of CPU. Further, the second calculation section 12B may be a GPU provided in the first calculation section 12A. Further, the second calculation section 12B may be a GPU that does not have the local memory 13 therein. In addition, the first calculation section 12A and the second calculation section 12B may be a calculator of a field programmable gate array (FPGA) or the like.

The memory 14 is non-volatile storage means for temporarily storing data in the first calculation section 12A and the second calculation section 12B. In a case where image processing is performed by the second calculation section 12B according to this embodiment, the first calculation section 12A transmits image data stored in the memory 14 or a storage region of the storage section 20 to the second calculation section 12B through the bus 26. Further, the second calculation section 12B stores image data transmitted from the first calculation section 12A in the local memory 13, and performs image processing with respect to the stored image data. The second calculation section 12B may directly read out image data stored in the memory 14 or the storage section 20 to perform image processing.

In a case where the computer 10 is embedded in the above-mentioned image handling device, as the display section 16 and the operating section 18, a display panel such as a liquid crystal display (LCD) provided in the image handling device may be employed. Further, in a case where the computer 10 is an independent computer, as the display section 16 and the operating section 18, for example, a display, a keyboard, a mouse, or the like connected to the computer 10 may be employed. In addition, the display section 16 and the operating section 18 may be a touch panel display in which a touch panel and a display are integrally formed, for example. Further, as the storage section 20, a hard disk drive (HDD), a solid state drive (SSD), or a non-volatile storage medium such as a flash memory may be employed.

The image data supply section 22 may be any device that is able to provide image data that is a processing target, which may be, for example, an image reading section that reads out an image recorded on a recording material such as a sheet or a photographic film and outputs image data. Further, as the image data supply section 22, for example, a reception section that receives image data from an external device through a communication line, the image storage section (the memory 14 or the storage section 20) that stores image data, and the like are applied.

The image output section 24 may be any device that is able to output image data obtained through image processing or an image expressed from the image data obtained through the image processing, which may be, for example, an image recording section that records an image expressed from image data on a recording material such as a sheet or a photosensitive material. Further, as the image output section 24, a display section (display section 16) that displays an image expressed from the image data on a display or the like, or a writing device that writes image data on a recording medium such as a compact disc read only memory (CD-ROM) may be employed. Further, as the image output section 24, a transmission section that transmits image data obtained through image processing to an external device through a communication line may be employed. Further, the image output section 24 may be an image storage section (the memory 14 or the storage section 20) that stores image data obtained through image processing.

As shown in FIG. 1, a variety of programs executed by the first calculation section 12A and the second calculation section 12B are stored in the storage section 20. In the storage section 20, a program of an operating system 30 that performs management of resources, management of execution of programs, communication between the computer 10 and the external device, and the like is stored as a part of the variety of programs. Further, in the storage section 20, an image processing program group 34 for causing the computer 10 to function as an image processing apparatus is stored as a part of the variety of programs. Further, in the storage section 20, an application program group 32 (hereinafter, referred to as an "application 32") including a variety of application programs for causing the image processing apparatus to perform desired image processing is stored as a part of the variety of programs.

The image processing program group 34 refers to programs made to reduce a burden on developing image processing programs executed by the above-described image handling device, portable device, PC, or the like. Further, the image processing program group 34 refers to programs made to be commonly executable in various devices (platforms) such as the above-described image handling device, portable device, PC, or the like.

The image processing apparatus realized by the image processing program group 34 constructs an image processing directed acyclic graph (DAG) 50A (of which details will be described later) that performs image processing instructed by the application 32 in accordance with a construction instruction from the application 32. Further, the image processing apparatus executes processing of the image processing DAG 50A in accordance with an execution instruction from the application 32. Thus, the image processing program group 34 provides an interface for instructing the construction of the image processing DAG 50A for performing desired image processing or instructing the execution of the image processing in the constructed image processing DAG 50A to the application 32.

With such a configuration, for example, in a case where any device that needs to perform image processing therein is newly developed, development of a program for performing the image processing may be performed as described hereinafter. In this case, the application 32 that causes the image processing program group 34 to perform the image processing necessary in the device using the interface may be developed. Accordingly, a developer does not need to develop a new program for actually performing image processing, which leads to reduction of a burden on the developer.

Next, the image processing program group 34 according to this embodiment will be described in detail. As shown in FIG. 1, the image processing program group 34 includes a module library 36, a program of a process construction section 42, and a program of a process controller 46.

In the module library 36, programs of a plurality of types of image processing modules 38 that perform predetermined different types of image processing are registered, respectively. The image processing may include, for example, an input process, a filtering process, a color conversion process, a magnification or reduction process (see a "magnification/reduction process" in FIG. 1), a skew angle detection process, an image rotation process, an image synthesis process, an output process, and the like.

Further, in the module library 36, an image processing module 38 having the same type of image processing and different details of image processing to be executed is also registered. In FIG. 1, such an image processing module is divided into "module 1" and "module 2", which are distinguished from each other using numerical characters attached to the ends thereof. For example, with respect to the image processing module 38 that performs the magnification or reduction process, an image processing module 38 that performs a reduction process of reducing vertical and horizontal sizes of an image by 50% by thinning out input image data every other pixel in respective directions of a horizontal direction and a vertical direction is prepared. Further, for example, with respect to the image processing module 38 that performs the magnification or reduction process, an image processing module 38 that performs a magnification or reduction process at a designated magnification or reduction ratio with respect to input image data is prepared, for example.

Further, for example, with respect to the image processing module 38 that performs the color conversion process, an image processing module 38 that converts an image in an RGB (red, green, blue) color space into an image in a CMYK (cyan, magenta, yellow, key-plate (black)) color space and an image processing module 38 that converts an image in a CMYK color space into an image in an RGB color space are prepared. Further, for example, with respect to the image processing module 38 that performs the color conversion process, an image processing module 38 that converts an image in an RGB color space into an image in a YCbCr color space and an image processing module 38 that converts an image in a YCbCr color space into an image in an RGB color space are prepared, for example.

Further, in the module library 36, a buffer module 40 that includes a storage region (buffer) for storing image data is also registered.

The process construction section 42 according to this embodiment constructs an image processing DAG 50A in the form of a DAG in accordance with an instruction from the application 32. In the image processing DAG 50A, for example, as shown in FIG. 2A, one or more image processing modules 38 are connected to each other through the buffer module 40 disposed in at least one of a front stage and a rear stage of each image processing module 38.

Each image processing module 38 is an example of an object that executes image processing with respect to input image data and outputs output image data. Further, the image processing DAG 50A is an example of an object group in which a plurality of image processing modules 38 are connected to each other. Further, in the example shown in FIG. 2A, it is shown that an image processing module 38 to which another image processing module 38 is connected at a front stage thereof through the buffer module 40 is in a state of being capable of executing its image processing in a case where image processing of the front-stage image processing module 38 is terminated. In addition, it is shown that an image processing module 38 to which a plurality of image processing modules 38 are connected at a front stage thereof through the buffer module 40 is in a state of being capable of executing its image processing in a case where entire image processing of the plural front-stage image processing modules 38 is terminated.

Figure 2A:
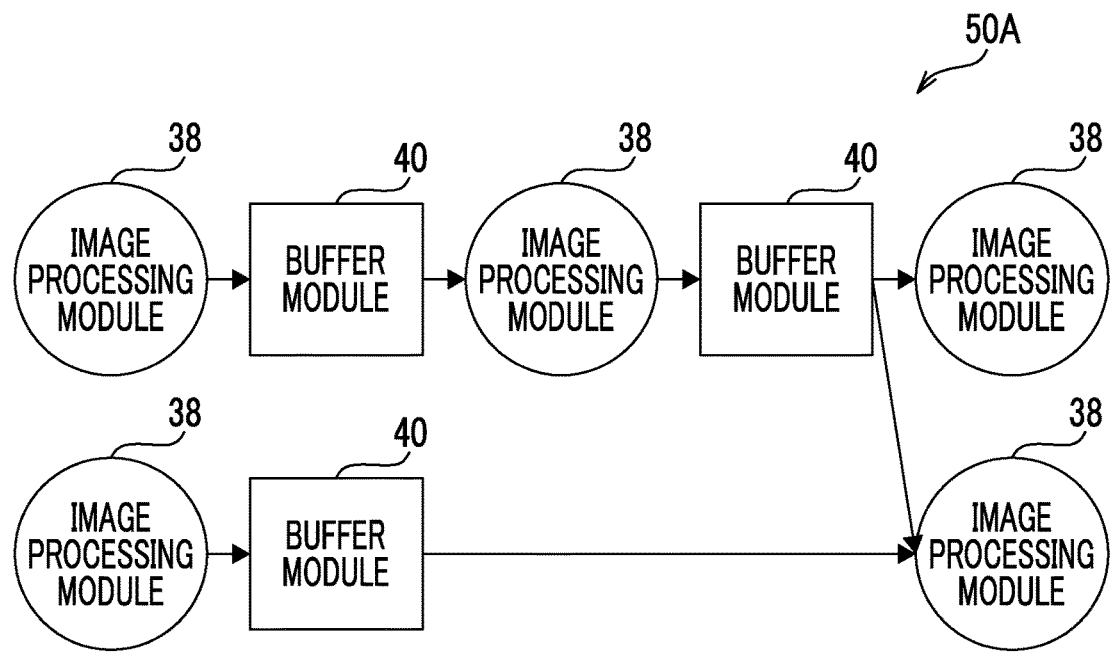
FIG. 2A is a schematic view showing an example of an image processing DAG.
Figure 2B:
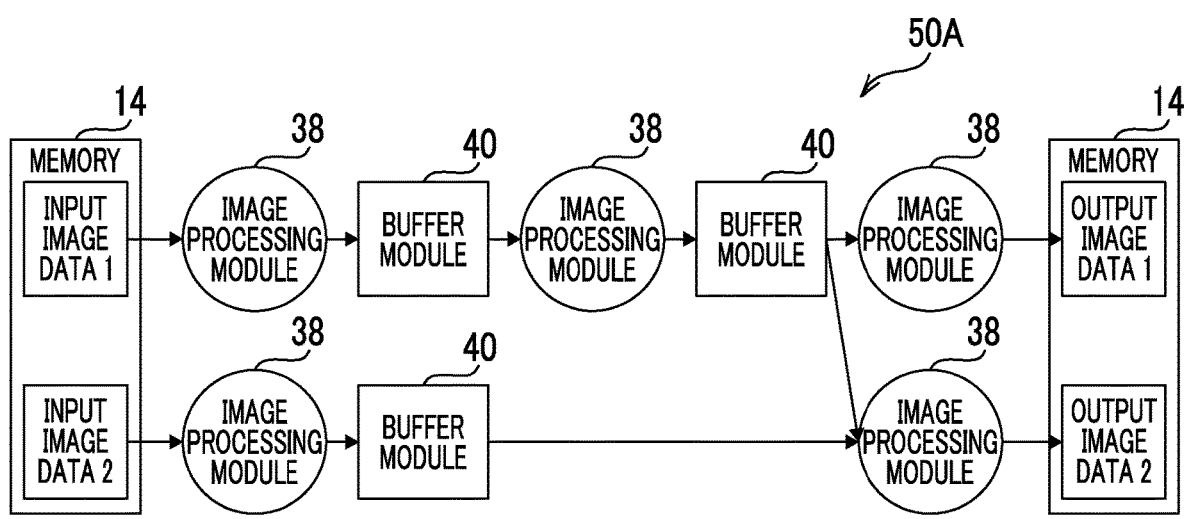
FIG. 2B is a schematic view in a case where an input/output memory is additionally provided in the image processing DAG.

Further, in FIG. 2A, a DAG in which only the respective modules are connected to each other in a processing order is shown, but in a case where the DAG is actually executed, as shown in FIG. 2B, image data stored in the memory 14 is input and image processing is performed in accordance with the DAG. Finally, a processing result of processed image data or the like is stored in the memory 14. In a case where image processing executed by each image processing module 38 is executed by the second calculation section 12B, the memory 14 shown in FIG. 2B becomes the local memory 13.

Figure 3:
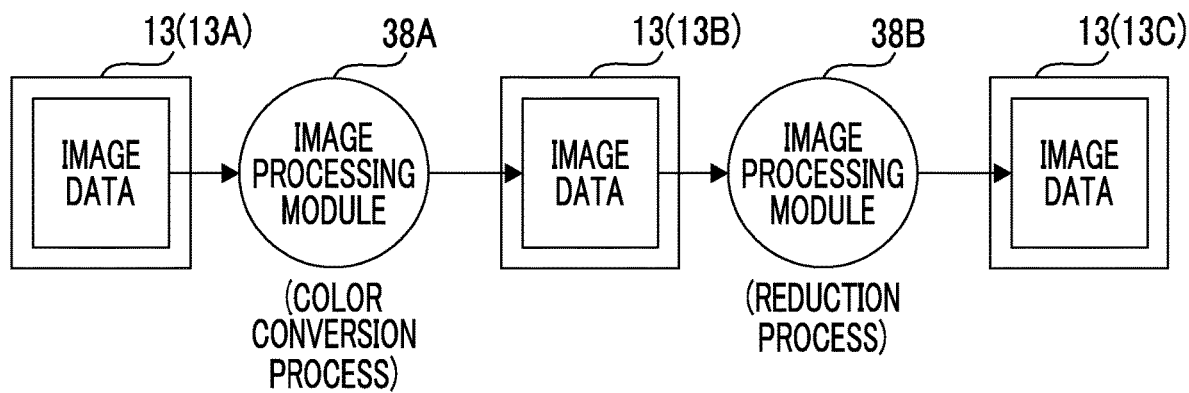
FIG. 3 is a schematic view showing an example of the image processing DAG.

Next, a case where the color conversion process and the reduction process are respectively and sequentially executed by an out-place process in the second calculation section 12B will be described with reference to FIG. 3. In FIG. 3, in order to distinguish between the image processing module 38 that performs the color conversion process and the image processing module 38 that performs the reduction process, letters of the alphabet are attached to the ends of signs. Further, in FIG. 3, for ease of description, instead of the buffer module 40, the local memory 13 that is a storage region of an input/output destination of each image processing module 38 is shown.

As shown in FIG. 3, an image processing module 38A performs a color conversion process with respect to image data stored in a storage region 13A of the local memory 13, and outputs image data after the color conversion process to a storage region 13B of the local memory 13. Further, an image processing module 38B performs a reduction process with respect to image data stored in the storage region 13B, and outputs image data after the reduction process to a storage region 13C of the local memory 13. In this way, in a case where image processing executed in the image processing module 38 is executed by the out-place processing, in the example shown in FIG. 3, storage regions corresponding to three pieces of image data are necessary.

Particularly, in a case where the capacity of the local memory 13 is smaller than that of the memory 14 as in a GPU, there is a concern that image processing may be abnormally terminated due to failure in securing a storage region. Further, according to content of image processing executed by the image processing module 38, there is a case where an in-place process cannot be performed. Accordingly, the computer 10 according to this embodiment determines whether the in-place process is possible in the image processing executed by the image processing module 38 according to the content of the image processing (whether performing overwriting on input image data using output image data is possible). Thus, the computer 10 according to this embodiment executes the image processing using the in-place process with respect to image processing for which it is determined that the in-place process is possible.

Figure 4:
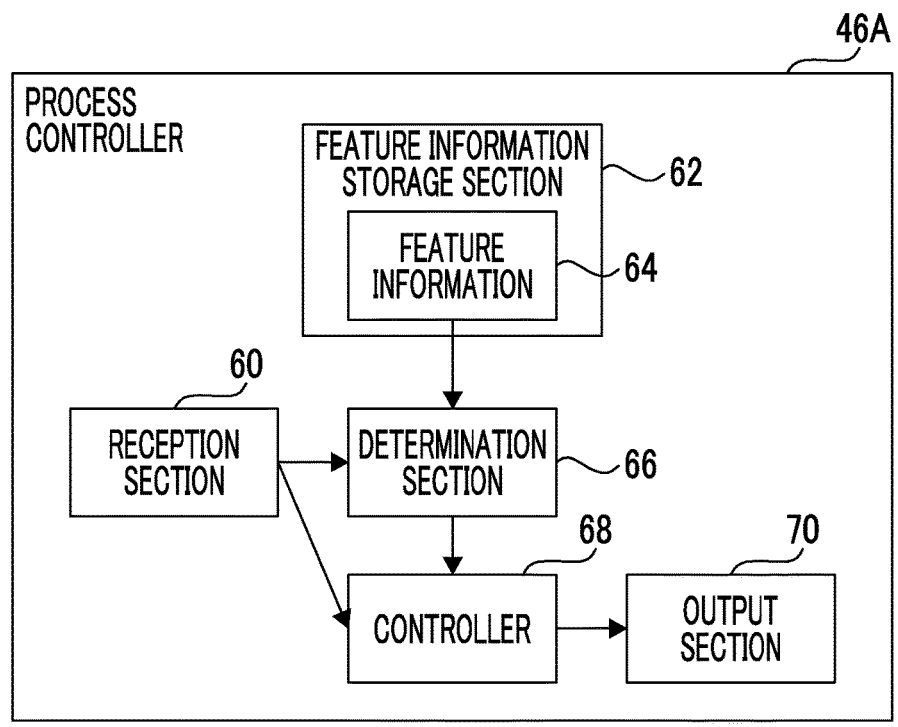
FIG. 4 is a block diagram showing an example of a functional configuration of a process controller according to a first embodiment.

Then, a functional configuration of the process controller 46A according to this embodiment will be described with reference to FIG. 4. As shown in FIG. 4, the process controller 46A includes a reception section 60, a feature information storage section 62, a determination section 66, a controller 68, and an output section 70.

The reception section 60 according to this embodiment receives an input from a user through the operating section 18, for example. The reception section 60 may receive instruction information indicating an instruction from a user transmitted from an external device through a communication line, for example, to receive an input from the user.

In the feature information storage section 62 according to this embodiment, feature information 64 in which content of image processing executed by the respective image processing modules 38 and possibility information relating to whether or not the in-place process is executable are associated with each other is stored in advance. For example, as shown in FIG. 5, the feature information 64 according to this embodiment includes the type of image processing as a large classification, processing content of the image processing as a small classification, and possibility information, in which the possibility information is associated with each piece of processing content of the image processing.

The possibility information is information indicating any one of three types of information of "essential", "possible", and "impossible". Here, image processing of which the possibility information is "essential" is a process in which it is essential to perform the in-place process. Further, image processing of which the possibility information is "possible" is a process in which either of the in-place process or the out-place process may be performed, and image processing of which the possibility information is "impossible" is a process in which it is essential to perform the out-place process.

For example, image processing executed by an image processing module 38 that converts an image in an RGB color space into an image in a YCbCr color space represents the image processing in which either of the in-place process or the out-place process may be performed. Further, image processing executed by an image processing module 38 that magnifies an image using linear interpolation represents the image processing in which it is essential to perform the out-place process. Further, image processing executed by an image processing module 38 that performs a process of adding a wing region to an image by duplicating pixels in edge portions of the image represents the image processing in which it is essential to perform the in-place process.

The determination section 66 according to this embodiment determines, on the basis of the feature information 64, whether the in-place process is possible in the image processing executed by each image processing module 38 of the image processing DAG 50A constructed by the process construction section 42, using processing content of the image processing. The determination section 66 according to this embodiment determines that the in-place process is possible in image processing having processing content in which the possibility information of the feature information 64 is "essential" or "possible".

Further, the determination section 66 determines that the in-place process is impossible in image processing having processing content in which the possibility information of the feature information 64 is "impossible". The determination section 64 may determine that the in-place process is also impossible in image processing in which the possibility information of the feature information 64 is "possible".

The controller 68 according to this embodiment performs, with respect to image processing for which it is determined by the determination section 66 that the in-place process is possible, a setting for setting a storage region of output image data of the image processing as a region including a storage region in which input image data for which the in-place process is possible is stored. In this embodiment, in a case where the size of the output image data is equal to or smaller than the size of the input image data, the controller 68 performs a setting for setting the storage region of the output image data as a region that is the same as the region in which the input image data for which the in-place process is possible is stored.

Further, in a case where the size of the output image data is larger than the size of the input image data, the controller 68 performs a setting as follows. In this case, the controller 68 performs a setting for setting a region obtained by increasing a capacity corresponding to a difference between the size of the output image data and the size of the input image data with respect to the storage region in which the input image data is stored, as the storage region of the output image data. In this case, the controller 68 may perform a setting for setting a region obtained by increasing a size with a margin being added to the difference between the size of the output image data and the size of the input image data with respect to the storage region in which the input image data is stored, as the storage region of the output image data.

Further, the controller 68 performs a control for executing image processing using the image processing DAG 50A for which the setting of the storage regions is performed as described above. That is, first, the controller 68 performs a control for executing image processing using the image processing module 38 at a first stage of the image processing DAG 50A. Then, the controller 68 performs a control for sequentially executing image processing using the image processing module 38 for which the execution is possible after the image processing using the image processing module 38 connected at the front stage is terminated. The controller 68 according to this embodiment performs a control for executing each image processing by the second calculation section 12B.

Figure 6:
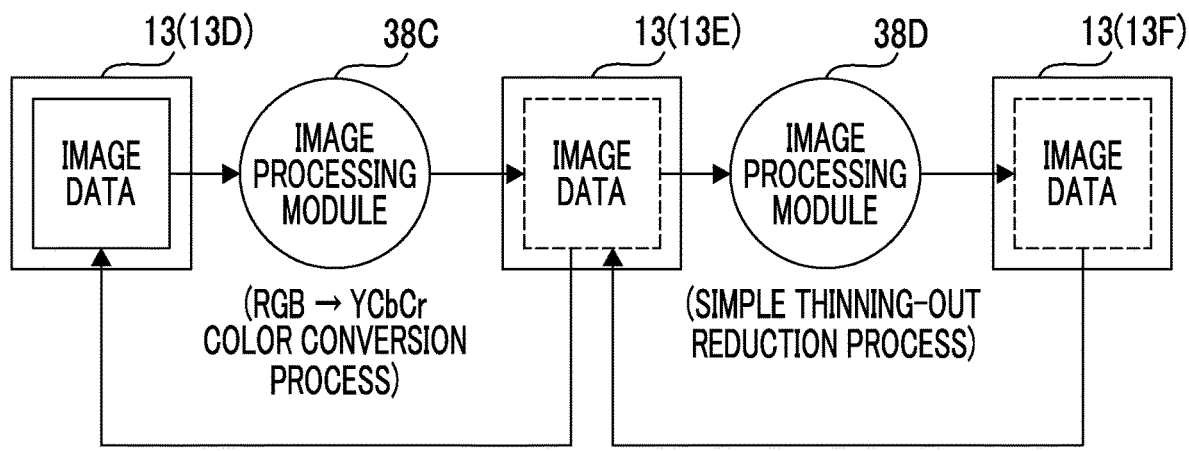
FIG. 6 is a schematic view showing an example of an image processing DAG in a case where an in-place process is performed.

A case where a simple thinning-out reduction process of reducing an image by thinning out pixels after performing image processing of converting an image in an RGB color space into an image in a YCbCr color space by the second calculation section 12B is performed will be described with reference to FIG. 6. In FIG. 6, in order to distinguish between the image processing module 38 that performs the image processing of converting the image in the RGB color space into the image in the YCbCr color space and the image processing module 38 that performs the simple thinning-out reduction process, alphabets are added to the ends of signs. Further, in FIG. 6, for ease of description, instead of the buffer module 40, the local memory 13 that is a storage region of an input/output destination of each image processing module 38 is shown.

As shown in FIG. 6, since the in-place process is possible in image processing executed by the image processing module 38C, a storage region 13D in which input image data of the image processing module 38C is stored is set as a storage region 13E of an output destination of the image processing module 38C. Further, since the in-place process is also possible in image processing executed by an image processing module 38D, a storage region 13E in which input image data of the image processing module 38D is stored is set as a storage region 13F of an output destination of the image processing module 38D.

As described above, since the storage region 13E is set to the storage region 13D, consequently, output image data obtained by the image processing in the image processing module 38D is stored in the storage region 13D. Accordingly, in this case, compared with a case where the in-place process is not performed, the amount of a used storage region of the local memory 13 is reduced to a half or smaller.

Figure 7:
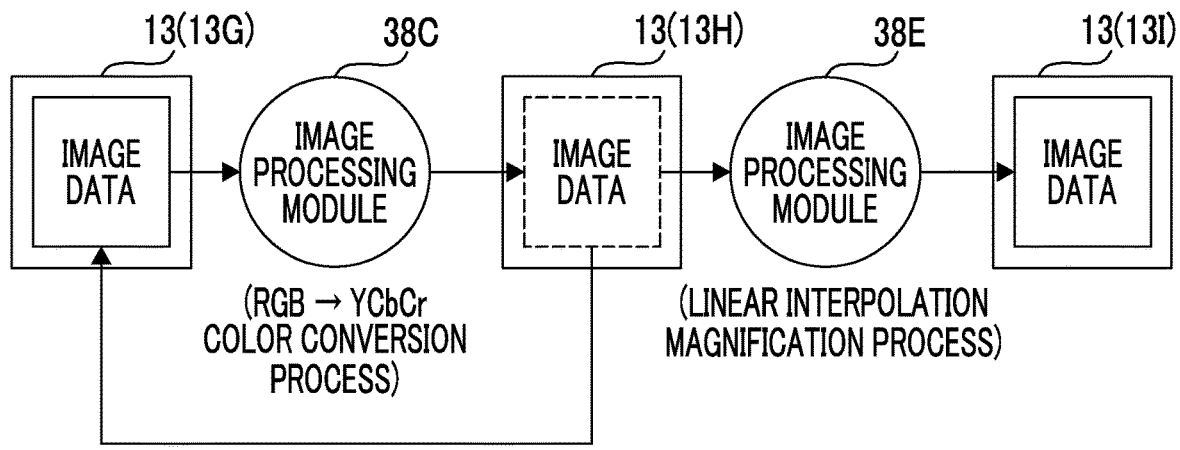
FIG. 7 is a schematic view showing an example of an image processing DAG in a case where an in-place process is performed.

Next, a case where a linear interpolation magnification process of magnifying an image by performing linear interpolation after performing image processing of converting an image in an RGB color space into an image in a YCbCr color space using the second calculation section 12B, for example, will be described with reference to FIG. 7. In FIG. 7, in order to distinguish between the image processing module 38 that performs the image processing of converting the image in the RGB color space into the image in the YCbCr color space and the image processing module 38 that performs the linear interpolation magnification process, alphabets are added to the ends of signs. Further, in FIG. 7, for ease of description, instead of the buffer module 40, the local memory 13 that is a storage region of an input/output destination of each image processing module 38 is shown.

As shown in FIG. 7, since the in-place process is possible in image processing executed by the image processing module 38C, a storage region 13G in which input image data of the image processing module 38C is stored is set as a storage region 13H of an output destination of the image processing module 38C. Further, since the in-place process is impossible in image processing executed by an image processing module 38E, a storage region that is newly secured by the operating system 30 is set as a storage region 13I of an output destination of the image processing module 38E. Accordingly, in this case, compared with a case where the in-place process is not performed, the amount of a used storage region of the local memory 13 is reduced by one piece of output image data.

Further, in a case where the reception section 60 receives an input indicating that a processing result of image processing executed by an object at a final stage of the image processing DAG 50A is abnormal, the controller 68 performs the following process. In this case, the controller 68 performs a setting for setting a storage region of output image data as a region different from a storage region of input image data with respect to at least one image processing for which it is determined by the determination section 66 that the in-place process is possible. Further, in this case, the controller 68 performs a control for executing image processing again by the image processing DAG 50A in which re-setting of a storage region is performed.

The output section 70 according to this embodiment outputs output image data obtained as a result of the image processing executed by the image processing module 38 at the final stage of the image processing DAG 50A. In this embodiment, the output section 70 displays the obtained output image data on the display section 16. The output section 70 may output (transmit) the output image data to an external device. Further, in a case where the computer 10 is embedded in a printer, the output section 70 may output (form) an output image indicated by the output image data onto a recording material such as a sheet.

Figure 8:
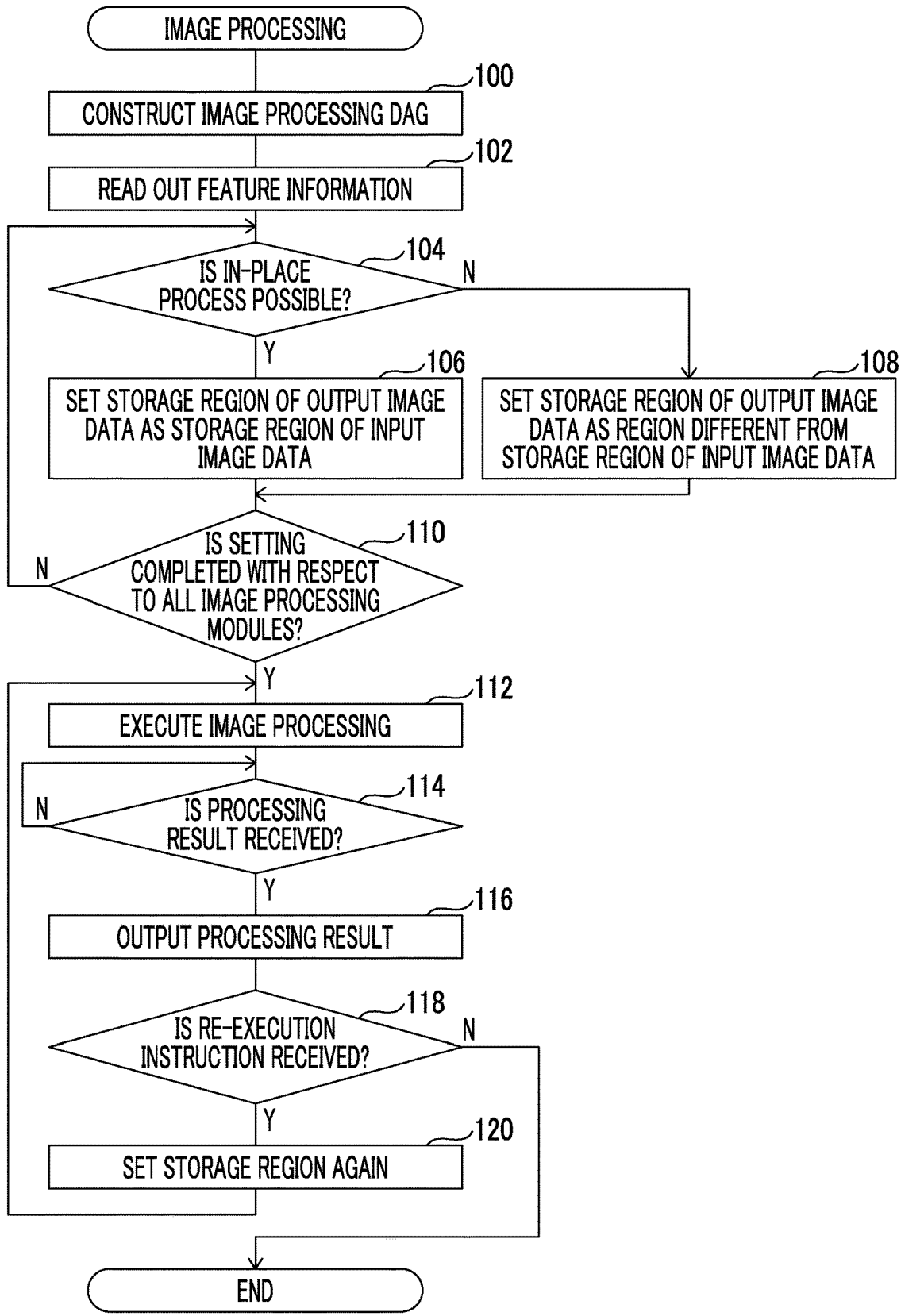
FIG. 8 is a flowchart showing a processing flow of an image processing program according to the first embodiment.

Then, an operation of the computer 10 according to this embodiment will be described with reference to FIG. 8. FIG. 8 is a flowchart showing a processing flow of an image processing program executed by the first calculation section 12A in a case where an instruction for starting execution of image processing is input by the application 32. Further, the image processing program is installed in the storage section 20 in advance. Further, as the first calculation section 12A executes the image processing program, the first calculation section 12A functions as the process construction section 42, the reception section 60, the determination section 66, the controller 68, and the output section 70.

In step 100 in FIG. 8, the process construction section 42 constructs the image processing DAG 50A that performs image processing instructed by the application 32 in accordance with a construction instruction from the application 32. In the next step 102, the determination section 66 reads out feature information 64 from the feature information storage section 62. Processes from the next step 104 to step 108 are repeatedly executed by selectively using one of all the image processing modules 38 of the image processing DAG 50A constructed by the process of step 100 as a processing target (hereinafter, referred to as a "processing target module 38"). In a case where the processes from step 104 to step 108 are repeatedly executed, an image processing module 38 that does not become the processing target up to that time is used as a processing target.

In step 104, the determination section 66 determines whether the in-place process is "essential" or "possible" with respect to processing content of image processing executed by the processing target module 38, on the basis of the feature information 64. In a case where the determination in the determination section 66 is negative, it is considered that the in-place process is "impossible", and then, the procedure proceeds to step 108. On the other hand, in a case where the determination is affirmative, the procedure proceeds to step 106.

In step 106, as described above, the controller 68 performs a setting for setting a storage region of output image data of the image processing as a region including a storage region in which input image data is stored, with respect to the image processing executed by the processing target module 38, and then, causes the procedure to proceed to step 110. On the other hand, in step 108, the controller 68 performs a setting for setting the storage region of the output image data of the image processing as a region different from the storage region of the input image data, with respect to the image processing executed by the processing target module 38, and then, causes the procedure to proceed to step 110.

In step 110, the controller 68 determines whether the processes from step 104 to step 108 are completed with respect to all the image processing modules 38 of the image processing DAG 50A constructed in step 100. In a case where the determination is negative, the controller 68 causes the procedure to return to step 104. On the other hand, in a case where the determination is affirmative, the controller 68 causes the procedure to proceed to step 112.

In step 112, the controller 68 performs a control for executing image processing in the image processing DAG 50A through the above-described processes, using the second calculation section 12B. The second calculation section 12B stores input image data transmitted from the first calculation section 12A in the local memory 13, and executes image processing in accordance with the image processing DAG 50A. In a case where the image processing in the image processing DAG 50A is terminated, the second calculation section 12B transmits output image data that is finally obtained (that is, output from the image processing module 38 at the final stage of the image processing DAG 50A) to the first calculation section 12A from the local memory 13.

Thus, in step 114, the controller 68 waits for reception of the output image data. In a case where the controller 68 receives the output image data, the determination in step 114 is affirmative, and thus, the procedure proceeds to step 116. In step 116, the output section 70 outputs the output image data received in step 114 on the display section 16.

A user confirms an output image indicated by the output image data displayed on the display section 16. Here, in a case where the output image is an abnormal image, the user inputs an instruction for executing image processing again through the operating section 18.

Thus, in step 118, the reception section 60 determines whether the instruction for executing image processing again is received. In a case where the determination in the reception section 60 is affirmative, the procedure proceeds to step 120.

In step 120, the controller 68 performs the following process, similarly to step 108, with respect to at least one image processing for which it is determined that the in-place process is possible in step 104. The controller 68 performs a setting for setting the storage region of the output image data of the image processing as a region different from the storage region of the input image data, and then, causes the procedure to return to step 112. The number of image processing modules 38 that becomes targets for the re-setting of the storage region in step 120 is not particularly limited, and may be one or two. Alternatively, all of the image processing modules 38 for which it is determined that the in-place process is possible in step 104 may be used as the targets.

On the other hand, in a case where the reception section 60 does not receive the instruction for executing image processing again even though a predetermined period elapses, the determination in step S118 becomes negative, and thus, the image processing is terminated.

As described above, according to this embodiment, it is determined whether the in-place process is possible in image processing in accordance with processing content of the image processing. Further, with respect to the image processing for which it is determined that the in-place process is possible, a setting for setting a storage region of output image data of the image processing as a region including a storage region in which input image data on which overwriting is possible is stored is performed. Thus, compared with a case where a method for causing a user to determine whether the in-place process is possible, it is possible to reduce a burden on the user, and to reduce the amount of a used storage region in image processing.

Further, according to this embodiment, in a case where an input indicating that a processing result of image processing is abnormal is received, a setting for setting the storage region of the output image data as a region different from the storage region of the input image data is performed with respect to at least one image processing for which it is determined that the in-place process is possible. As a result, in a case where the processing result of the image processing is abnormal due to the in-place process, the image processing is executed again by only a re-execution instruction from a user. Thus, it is possible to further reduce a burden on the user.

In addition, according to this embodiment, image processing is executed by a processor (second calculation section 12B) different from a processor (first calculation section 12A) in which determination in the determination section 66 is executed. Thus, compared with a case where image processing is executed by the same processor as the processor in which the determination in the determination section 66 is executed, it is possible to execute the image processing at high speed.

Furthermore, according to this embodiment, image processing is performed by the GPU (second calculation section 12B). Generally, since the capacity of the local memory 13 of the GPU is smaller than the capacity of the memory 14, in a case where the image processing is executed by the GPU using an out-place process, a possibility that security of a storage region fails is relatively high. On the other hand, according to this embodiment, it is possible to reduce the amount of a used storage region in image processing, and thus, it is possible to reduce a possibility that security of a storage region fails.

Second Embodiment

A second embodiment of the invention is different from the first embodiment in that input image data is divided. The same reference numerals are given to components having the same functions as in the first embodiment, and description thereof will not be repeated.

First, a configuration of a computer 10 according to this embodiment will be described with reference to FIG. 1. As shown in FIG. 1, an image processing program group 34 according to this embodiment includes a program of a process controller 46B.

Further, a second calculation section 12B according to this embodiment includes a local memory 13 and has a plurality of (in this embodiment, four) processor cores. Further, the second calculation section 12B has a plurality (in this embodiment, four) of L1 (Level 1) caches that are provided to correspond to the respective processor cores one to one and are used as cache memories by the processor cores. Further, the second calculation section 12B includes one L2 (Level 2) cache having a capacity larger than that of one L1 cache, which is used as a cache memory shared by the respective processor cores.

That is, in this embodiment, the L2 cache is a cache memory that is most distant from the processor of the second calculation section, that is, a so-called last level cache (LLC). The number of levels of the cache memories is not limited to two, and may be three or more.

Further, the first calculation section 12A according to this embodiment includes, similarly to the second calculation section 12B, a plurality of processor cores, an L1 cache, and an L2 cache.

Further, in each image processing module 38 according to this embodiment, a setting of which one of the first calculation section 12A and the second calculation section 12B image processing is to be executed by may be performed. In this embodiment, a case where which one of the first calculation section 12A and the second calculation section 12B image processing is executed by is set in advance for each image processing module 38 in accordance with processing content of the image processing module 38 is shown, but the invention is not limited thereto. For example, a user may set which one of the first calculation section 12A and the second calculation section 12B image processing is to be executed for each image processing module 38.

Figure 9:
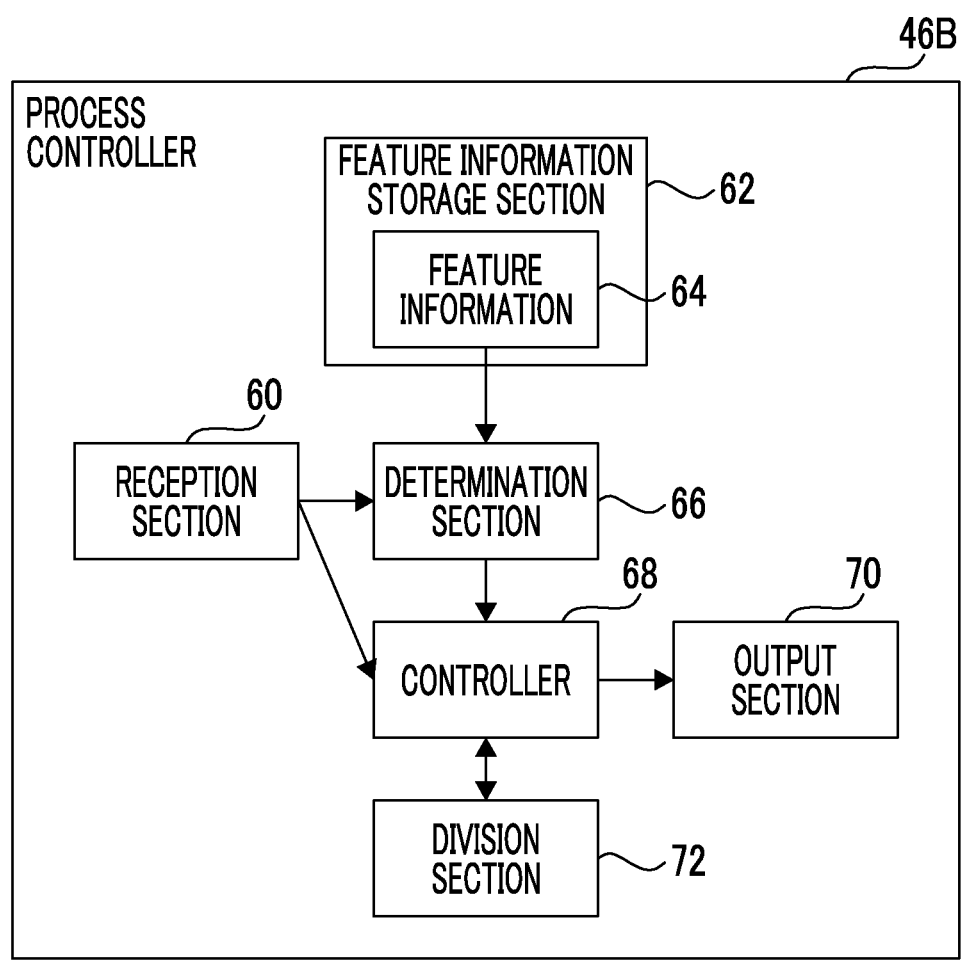
FIG. 9 is a block diagram showing an example of a functional configuration of a process controller according to a second embodiment.

Then, a configuration of the process controller 46B according to this embodiment will be described with reference to FIG. 9. As shown in FIG. 9, the process controller 46B includes a division section 72.

Figure 10:
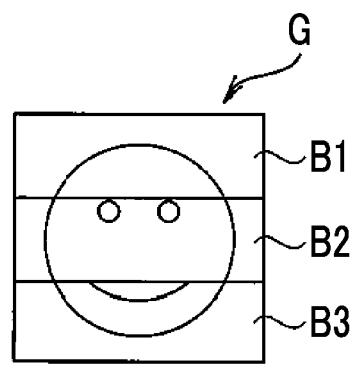
FIG. 10 is a schematic view for illustrating an input image division process.

The division section 72 according to this embodiment divides an image expressed by a part that is a processing target of input image data into a plurality of divided images. For example, as shown in FIG. 10, the division section 72 divides an image G expressed by a part of input image data that is a processing target into a plurality of (in the example shown in FIG. 10, three) divided images B1 to B3. Hereinafter, image data indicating divided images is referred to as "divided image data". Further, with respect to the part of the input image data that is the processing target, in the case of image processing in which an entire input image is a processing target as in a color conversion process, the entire input image data becomes the part that is the processing target. In addition, with respect to the part of the input image data that is the processing target, in the case of image processing in which a part of an input image is a target as in a trimming process, the part of the input image becomes the part that is the processing target of the image processing. Hereinafter, for ease of description, the part of the input image data that is the processing target is simply referred to as "input image data".

Further, in the example shown in FIG. 10, the division section 72 divides the image G in a vertical direction, but is not limited thereto. For example, the division section 72 may divide the image G in a horizontal direction, or in horizontal and vertical directions.

In a case where image processing is executed by the second calculation section 12B, the division section 72 divides input image data into a plurality of pieces of divided image data having a size depending on a capacity of the LLC (L2 cache) of the second calculation section 12B. In this embodiment, the division section 72 divides input image data into a plurality of pieces of divided image data having the same size, which is a size that is equal to or smaller than the capacity of the LLC of the second calculation section 12B and that matches the capacity of the LLC to the utmost. That is, for example, in a case where the size of input image data is 6 MB and the capacity of the LLC of the second calculation section 12B is 2 MB, the size of each divided image data becomes 2 MB. Further, in a case where the size of input image data is 4.5 MB and the capacity of the LLC of the second calculation section 12B is 2 MB, the size of each divided image data becomes 1.5 MB.

On the other hand, in a case where image processing is executed by the first calculation section 12A, the division section 72 divides input image data into a plurality of pieces of divided image data having a size depending on a capacity of a cache memory (in this embodiment, the L1 cache memory) other than the LCC of the first calculation section 12A. In this embodiment, the division section 72 divides input image data into a plurality of pieces of divided image data having the same size, which is a size that is equal to or smaller than the capacity the L1 cache of the first calculation section 12A and that matches the capacity of the L1 cache to the utmost. In a case where the first calculation section 12A has cache memories of three or more levels, the division section 72 may divide input image data into divided image data having a size depending on a capacity of one predetermined cache memory (for example, the L2 cache) other than the LLC.

Figure 11:
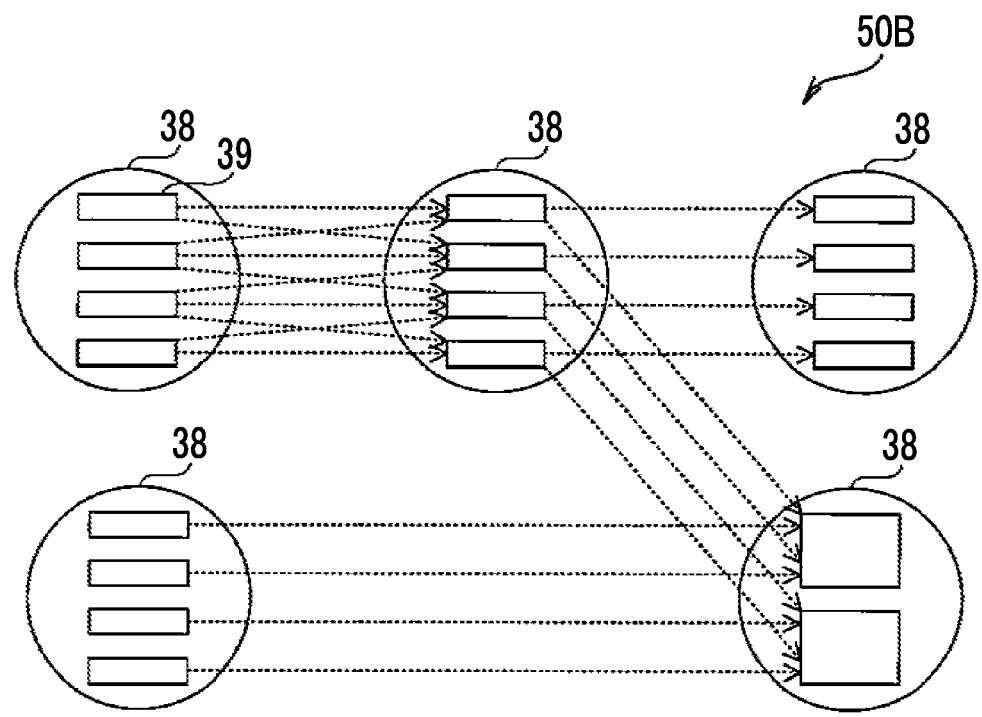
FIG. 11 is a schematic view showing an example of an image processing DAG in which an image processing module is divided into partial processes.

Further, for example, as shown in FIG. 11, the division section 72 divides image processing executed by each image processing module 38 with respect to the image processing DAG 50A into partial processes 39 (tasks) corresponding to each piece of divided image data to construct an image processing DAG 50B. In FIG. 11, for ease of description, the buffer module 40 is not shown. Further, the division section 72 assigns a dependency relationship between a partial process 39 of the image processing module 38 connected at a front stage and a partial process 39 of the image processing module 38 connected at a rear stage, in accordance with the type of image processing executed by the image processing module 38. In FIG. 11, the dependency relationship is indicated by a dashed arrow.

For example, in a process of performing image processing only with respect to a pixel that is a processing target, such as a color conversion process, each partial process 39 satisfies a one-to-one dependency relationship. On the other hand, for example, in image processing in which peripheral pixels of a pixel that is a processing target are also necessary, such as a filtering process, a dependency relationship is also assigned to a front-stage partial process 39 of performing image processing with respect to the peripheral pixels. Each partial process 39 is executable in a case where a partial process 39 that has a dependency relationship at a front stage is not present or all partial processes 39 that have a dependency relationship are terminated.

Figure 12:
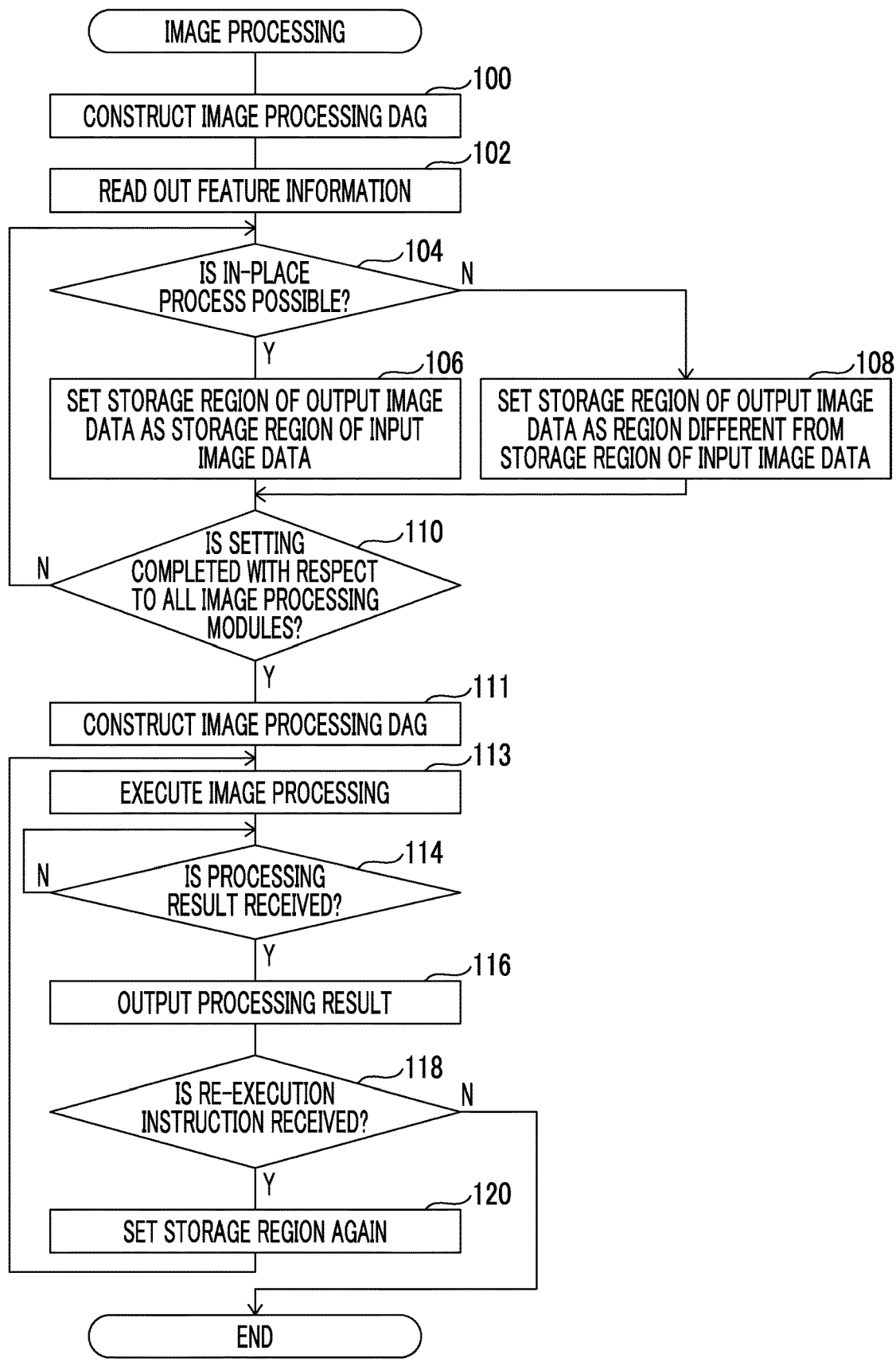
FIG. 12 is a flowchart showing a processing flow of an image processing program according to the second embodiment.

Next, an operation of the computer 10 according to the embodiment will be described with reference to FIG. 12. FIG. 12 is a flowchart that shows a processing flow of an image processing program executed by the first calculation section 12A in a case where an instruction for starting execution of image processing is input by the application 32. Further, the image processing program is installed in the storage section 20 in advance. Further, as the first calculation section 12A executes the image processing program, the first calculation section 12A functions as the process construction section 42, the reception section 60, the determination section 66, the controller 68, the output section 70, and the division section 72. Further, in FIG. 12, the same step numbers as in FIG. 8 are assigned to steps for executing the same processes as in FIG. 8, and description thereof will not be repeated.

In step 111 in FIG. 12, as described above, the division section 72 divides input image data into a plurality of pieces of divided image data in accordance with information indicating which calculation section image processing in each image processing module 38 of the image processing DAG 50A is to be executed by. Further, the division section 72 divides image processing executed by each image processing module 38 into partial processes 39 with respect to the image processing DAG 50A through the above-described processes, as described above, to assign a dependency relationship between the partial processes 39 of the directly connected image processing modules 38. That is, in step 111, the division section 72 constructs the image processing DAG 50B.

In the next step 113, the controller 68 performs a control for executing image processing in accordance with the image processing DAG 50B constructed in step 111. That is, the controller 68 performs a control for executing partial processes of the image processing module 38 set so that the execution is performed by the first calculation section 12A in the image processing DAG 50B using each processor core of the first calculation section 12A. Further, the controller 68 performs a control for executing partial processes of the image processing module 38 set so the execution is performed by the second calculation section 12B in the image processing DAG 50B using each processor core of the second calculation section 12B. The controller 68 sequentially performs these controls with respect to the partial processes 39 that are executable in accordance with the image processing DAG 50B.

In a case where the entire image processing module 38 at the final stage of the image processing DAG 50B is set so that the execution is performed by the first calculation section 12A, the process of step 114 is not necessary.

As described above, according to this embodiment, it is possible to achieve the same effects as in the first embodiment.

Further, according to this embodiment, input image data of the image processing module 38 executed by the second calculation section 12A (GPU) is divided into a plurality of pieces of divided image data having a size depending on a capacity of the LCC of the second calculation section 12A. In a case where image processing is executed by the second calculation section 12A, if the number of pieces of divided image data is extremely large, overhead of data transmission between the first calculation section 12A (CPU) and the second calculation section 12B relatively increases. Accordingly, in this embodiment, compared with a case where input image data is divided into divided image data having a size of the L1 cache, it is possible to reduce overhead. In addition, in a state where image processing is parallelized, a hit rate of the LLC is enhanced. Accordingly, according to this embodiment, it is possible to execute image processing at higher speed.

Further, according to this embodiment, input image data of the image processing module 38 executed by the first calculation section 12A (CPU) is divided into a plurality of pieces of divided image data having a size depending on a capacity of L1 cache of the first calculation section 12A. Thus, a hit rate of the L1 cache faster than that of the LLC is enhanced in a state where the image processing is parallelized, it is possible to execute image processing at higher speed.

In the respective embodiments, the division section 72 may divide input image data with a predetermined number or size.

Further, in the respective embodiments, a form in which various programs are stored (installed) in the storage section 20 in advance has been described, but the invention is not limited thereto. The various programs may be provided in a form of being recorded on a recording medium such as a CD-ROM, a digital versatile disk read only memory (DVD-ROM), or a universal serial bus (USB). In addition, the various programs may be provided in a form of being downloaded from an external device through a network.

This application is based on Japan Patent Application No. 2016-060522, filed on Mar. 24, 2016 in the Japanese Intellectual Property Office, the disclosure of which is incorporated herein by reference.

All documents, patent applications and technical standard written in this specification are incorporated herein by reference to the same degree as in a case where each of the documents, the patent applications, and the technical standards is specifically and individually written to be incorporated by reference.

What is claimed is:

1. An image processing apparatus that executes image processing using an object group in which a plurality of objects, that perform image processing with respect to input image data stored in a storage region and that output output image data, are connected to each other, the image processing apparatus comprising:
 a determination section that determines whether performing overwriting on the input image data using the output image data is possible according to each piece of processing content of the image processing;
 a controller that performs a setting for setting a storage region of the output image data of the image processing as a region including a storage region in which the input image data on which the overwriting is possible is stored, and performs a control for executing the image processing using the object group, with respect to the image processing for which it is determined by the determination section that the overwriting is possible; and
 a division section that divides a part that is a processing target of the input image data into a plurality of pieces of divided image data,
 wherein the controller performs the control for executing the image processing using the object group for each piece of the divided image data,
 wherein the division section divides, in a case where the image processing is executed using a graphics processing unit having a cache memory and a local memory, the input image data into image data having a size depending on a capacity of a last level cache of the graphics processing unit, and
 wherein the controller sets, in a case in which the size of the output image data is larger than the size of the input image data on which the overwriting is possible, a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

2. The image processing apparatus according to claim 1, further comprising:
 an output section that outputs output image data of a processing result of image processing executed by an object at a final stage of the object group; and
 a reception section that receives an input from a user,
 wherein the controller performs a setting for setting the storage region of the output image data as a region different from the storage region of the input image data and performs a control for executing the image processing using the object group again, with respect to at least one image processing for which it is determined by the determination section that the overwriting is possible, in a case where an input indicating that the processing result is abnormal is received by the reception section.

3. The image processing apparatus according to claim 1, wherein the controller performs the control for executing the image processing using a processor different from a processor in which the determination in the determination section is executed.

4. The image processing apparatus according to claim 3, wherein the controller performs the control for executing the image processing using a graphics processing unit having a local memory.

5. An image processing apparatus that executes image processing using an object group in which a plurality of objects, that perform image processing with respect to input image data stored in a storage region and that output output image data, are connected to each other, comprising:
 a determination section that determines whether performing overwriting on the input image data using the output image data is possible according to each piece of processing content of the image processing;
 a controller that performs a setting for setting a storage region of the output image data of the image processing as a region including a storage region in which the input image data on which the overwriting is possible is stored, and performs a control for executing the image processing using the object group, with respect to the image processing for which it is determined by the determination section that the overwriting is possible; and
 a division section that divides a part that is a processing target of the input image data into a plurality of pieces of divided image data,
 wherein the controller performs the control for executing the image processing using the object group for each piece of the divided image data,
 wherein the division section divides, in a case where the image processing is executed using a central processing unit having a cache memory, the input image data into image data having a size depending on a capacity of a predetermined cache memory other than a last level cache of the central processing unit, and
 wherein the controller sets, in a case in which the size of the output image data is larger than the size of the input image data on which the overwriting is possible, a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

6. An image processing method comprising:
 executing image processing using an object group in which a plurality of objects, that perform image processing with respect to input image data stored in a storage region and that output output image data, are connected to each other;
 determining whether performing overwriting on the input image data using the output image data is possible according to each piece of processing content of the image processing; and
 performing a setting for setting a storage region of the output image data of the image processing as a region including a storage region in which the input image data on which the overwriting is possible is stored, and performing a control for executing the image processing using the object group, with respect to the image processing for which it is determined that the overwriting is possible;
 wherein the image processing using the object group comprises:
 dividing a part that is a processing target of the input image data into a plurality of pieces of divided image data, wherein in a case where the image processing is executed using a graphics processing unit having a cache memory and a local memory, dividing the input image data into image data having a size depending on a capacity of a last level cache of the graphics processing unit, executing the image processing using the object group for each piece of the divided image data, and in a case in which the size of the output image data is larger than the size of the input image data on which the overwriting is possible, setting a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

7. A non-transitory storage medium storing an image processing program causing a computer to perform an image processing, the image processing comprising:

executing image processing using an object group in which a plurality of objects, that perform image processing with respect to input image data stored in a storage region and that output output image data, are connected to each other;

determining whether performing overwriting on the input image data using the output image data is possible according to each piece of processing content of the image processing; and performing a setting for setting a storage region of the output image data of the image processing as a region including a storage region in which the input image data on which the overwriting is possible is stored, and performing a control for executing the image processing using the object group, with respect to the image processing for which it is determined that the overwriting is possible;

wherein the image processing using the object group comprises:

dividing a part that is a processing target of the input image data into a plurality of pieces of divided image data, wherein in a case where the image processing is executed using a graphics processing unit having a cache memory and a local memory, dividing the input image data into image data having a size depending on a capacity of a last level cache of the graphics processing unit, executing the image processing using the object group for each piece of the divided image data, and in a case in which the size of the output image data is larger than the size of the input image data on which the overwriting is possible, setting a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

8. An image processing method comprising:

executing image processing using an object group in which a plurality of objects, that perform image processing with respect to input image data stored in a storage region and that output output image data, are connected to each other;

determining whether performing overwriting on the input image data using the output image data is possible according to each piece of processing content of the image processing; and performing a setting for setting a storage region of the output image data of the image processing as a region including a storage region in which the input image data on which the overwriting is possible is stored, and performing a control for executing the image processing using the object group, with respect to the image processing for which it is determined that the overwriting is possible;

wherein the image processing using the object group comprises:

dividing a part that is a processing target of the input image data into a plurality of pieces of divided image data, wherein in a case where the image processing is executed using a central processing unit having a cache memory, the input image data into image data having a size depending on a capacity of a predetermined cache memory other than a last level cache of the central processing unit, executing the image processing using the object group for each piece of the divided image data, and in a case in which the size of the output image data is larger than the size of the input image data on which the overwriting is possible, setting a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

9. A non-transitory storage medium storing an image processing program causing a computer to perform an image processing, the image processing comprising:

executing image processing using an object group in which a plurality of objects, that perform image processing with respect to input image data stored in a storage region and that output output image data, are connected to each other;

determining whether performing overwriting on the input image data using the output image data is possible according to each piece of processing content of the image processing; and performing a setting for setting a storage region of the output image data of the image processing as a region including a storage region in which the input image data on which the overwriting is possible is stored, and performing a control for executing the image processing using the object group, with respect to the image processing for which it is determined that the overwriting is possible;

wherein the image processing using the object group comprises:

dividing a part that is a processing target of the input image data into a plurality of pieces of divided image data, wherein in a case where the image processing is executed using a central processing unit having a cache memory, the input image data into image data having a size depending on a capacity of a predetermined cache memory other than a last level cache of the central processing unit, executing the image processing using the object group for each piece of the divided image data, and in a case in which the size of the output image data is larger than the size of the input image data on which the overwriting is possible, setting a region obtained by increasing a capacity in a predetermined range that is equal to or greater than a difference between the size of the output image data and the size of the input image data on which the overwriting is possible with respect to the storage region in which the input image data on which the overwriting is possible is stored, as the storage region of the output image data.

* * * * *